Sept. 6, 1960   H. E. JACKSON ET AL   2,951,556
LUBRICATION SYSTEM FOR VEHICLES AND MACHINES
Filed July 18, 1957   3 Sheets-Sheet 2
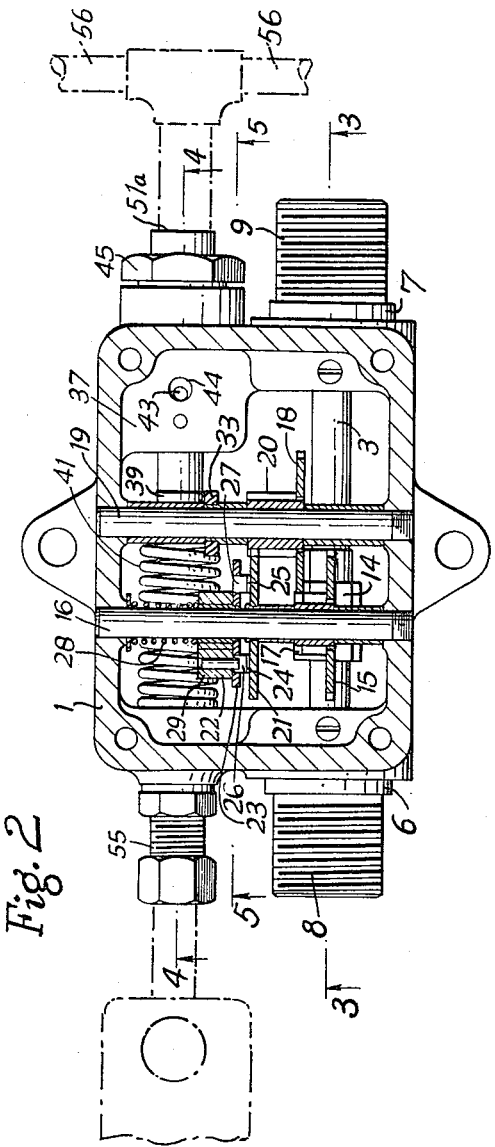
INVENTORS
Harold Ernest Jackson,
Ronald Edward Canfield and
Kenneth Edward Nicholls
by Edw. P. Walton Jr.   ATTORNEY Sept. 6, 1960  H. E. JACKSON ET AL  2,951,556
LUBRICATION SYSTEM FOR VEHICLES AND MACHINES
Filed July 18, 1957  3 Sheets-Sheet 3
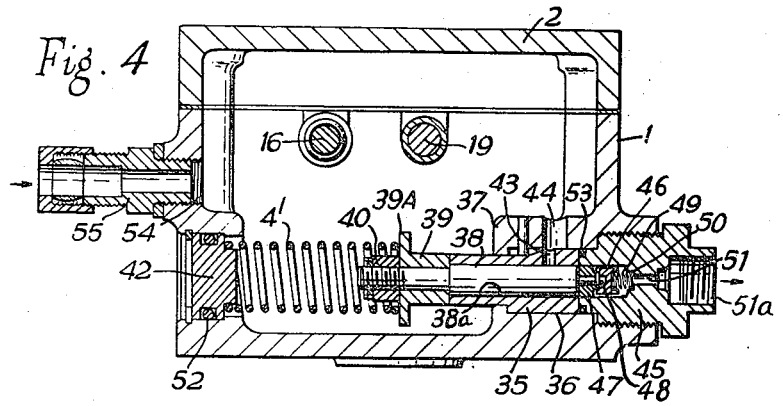
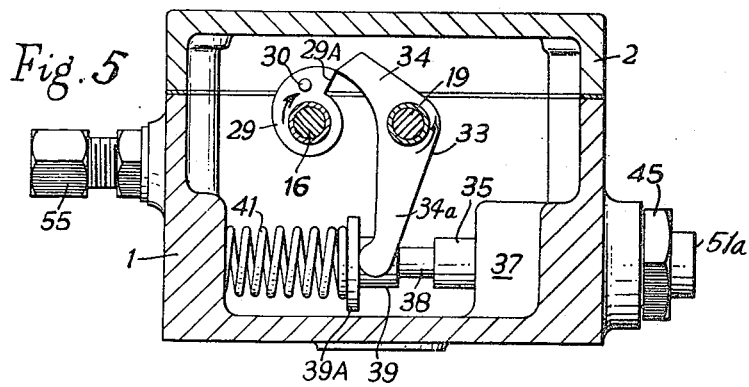
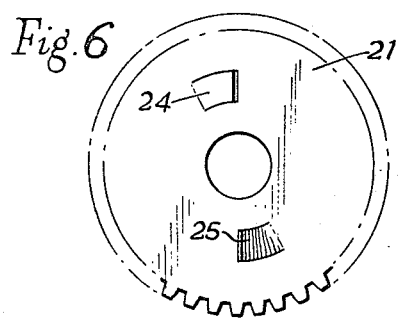
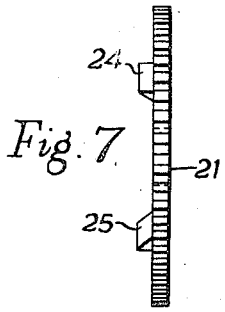

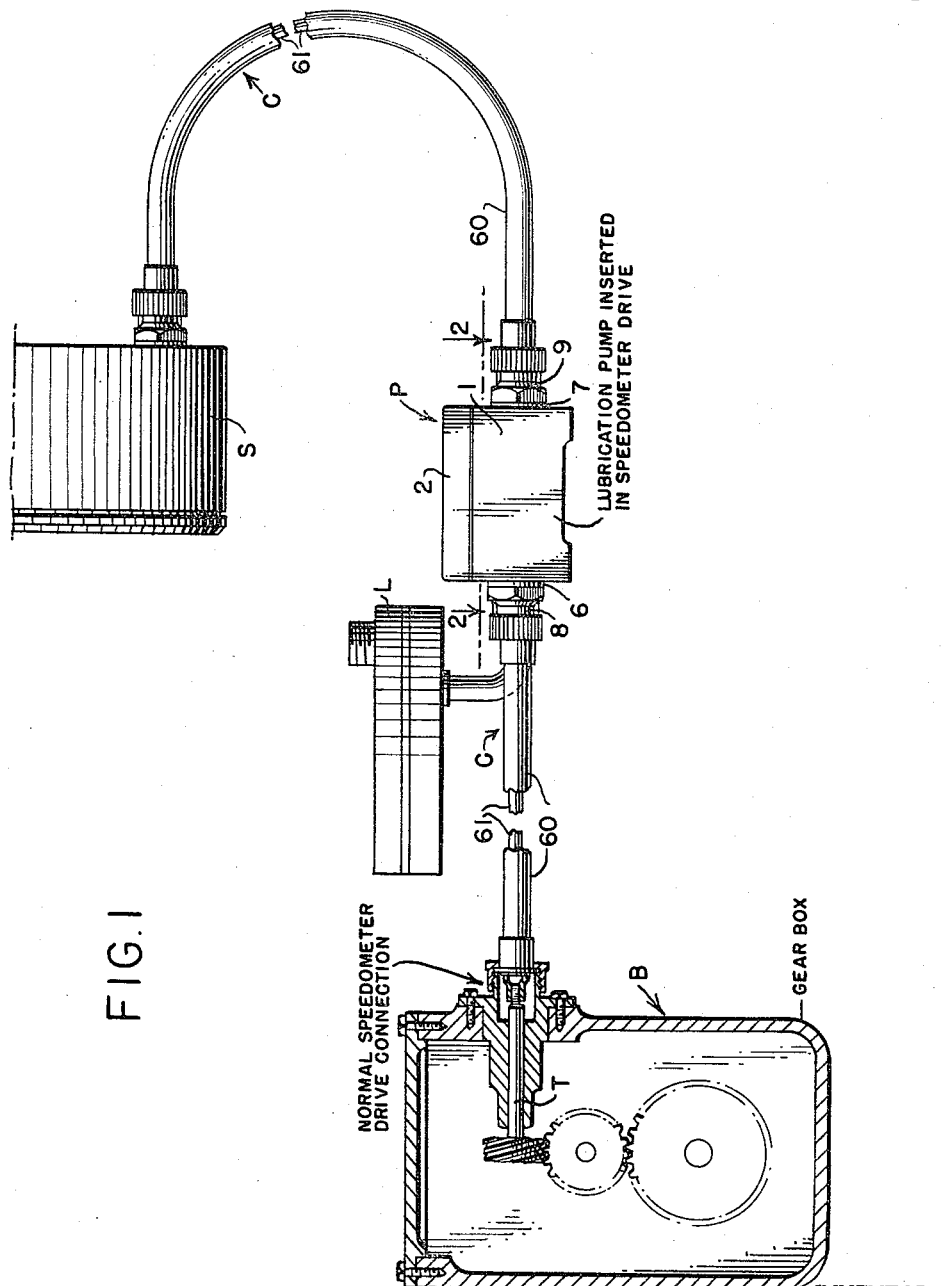

United States Patent Office 2,951,556
Patented Sept. 6, 1960

2,951,556

LUBRICATION SYSTEM FOR VEHICLES AND MACHINES

Harold Ernest Jackson, Plympton, St. Maurice, and Ronald Edward Farnfield and Kenneth Edmund Nicholds, Plymouth, England, assignors to Tecalemit Limited, Brentford, Middlesex, England Filed July 18, 1957, Ser. No. 672,632

Claims priority, application Great Britain July 18, 1956

3 Claims. (Cl. 184—27)

The invention relates to a lubricant delivery device for delivering predetermined amounts of lubricant to the operating parts of a mechanism according to the time or distance the mechanism has run or operated since its last lubrication by the device, this timing being controlled by the mechanism, itself, to be lubricated.

The object of the present invention is to provide a simple and relatively inexpensive lubrication device, of the kind just mentioned, having novel features of construction which render it not only easily manufactured but readily and easily applied to existing mechanism.

Other objects and advantages of the present invention will be apparent from the following detailed description in which, for purposes of an example, the constructional form of the invention is described and illustrated as applied to a vehicle, wherein the lubricating device is effectively actuated in one direction through mechanism which includes a shaft coupled to the flexible driving shaft of a speedometer cable.

The lubricating device includes a pump enclosed in a casing with a reduction gearing and a clutch and may be arranged adjacent to a driven part or shaft of the vehicle, to be lubricated, so that it is driven directly from such part or shaft or, alternatively and as shown, it may be arranged in any convenient position on the vehicle to be driven by the flexible drive of the speedometer.

With reference to the drawings, which form a part of this specification by reference, the invention is shown in the form in which it is at present devised and in which:

Figure 1 is a diagrammatic view of a speedometer driven from the transmission gear-box of an automobile or the like and having the lubrication device interposed in the drive connection therebetween;

Figure 2 is a plan view partly in section of the lubricating device and taken substantially on line 2—2 of Figure 1;

Figure 3 is a sectional elevation on the line 3—3 in Figure 2;

Figure 4 is a sectional elevation on the line 4—4 in Figure 2 and showing the pump piston at the end of the discharge stroke;

Figure 5 is a sectional elevation on the line 5—5 in Figure 2 showing the pump piston at the end of the suction stroke;

Figure 6 is a plan view of the final drive gear wheel showing the clutch dogs;

Figure 7 is an end view of the gear wheel; and

Figure 8 is a transverse section of the gear wheel.

Referring to the drawings:

The pump mechanism P, which is driven by the vehicle speedometer cable C, comprises a casing 1 which is adapted to be fixed in a suitable position on the vehicle and the open top of which is closed by means of a detachable cover 2 (see Figs. 1 and 3). A longitudinal pump-driving shaft 3 (Figs. 2 and 3) is journalled in bearings 4 and 5 provided in coaxial bearing housings 6 and 7 fixed in the end walls of the casing.

In order to accommodate the pump assembly, in the length of the speedometer cable drive C extending from the propeller shaft T in the gear-box B to the speedometer S, the cable C is made up of two separate lengths, one of which extends from the propeller shaft up to one end of the pump driving shaft 3 while the other length extends from the other end of the shaft 3 to the speedometer S. The inner ends of the shielding tube 60 of said lengths of cable, extending respectively from the propeller shaft T and from the speedometer S, are fixed on the ends of threaded sleeve extensions 8 and 9 projecting outwardly from the bearing housings 6 and 7 in front of oil seals 10 and 11 surrounding the pump driving shaft 3 and at the inner ends of said sleeve extensions. The ends of the two lengths of the inner rotating flexible shaft 61 of the speedometer cable are attached to the pump driving shaft by means of sockets 62 engaged over the ends 12 and 13 of the pump driving shaft 3 which project outwardly into the sleeve extensions 8 and 9 and which are squared so as to provide socket joints.

The pump driving shaft 3 is fitted with a worm 14 which is pinned to the said shaft and forms part of a gear speed reduction drive and which engages an initial-drive spur wheel 15 rotatably mounted on a support shaft 16 (hereinafter referred to as the "left hand support shaft") transversely fixed in the casing 1 near one end of the latter. The initial drive spur wheel 15 is fitted on to an initial-drive pinion 17, Fig. 2, which is also turnably arranged on the support shaft 16 and which engages with an intermediate-drive spur wheel 18 turnably arranged on a second support shaft 19 (hereinafter called the "right hand support shaft") which is transversely disposed in the casing and is parallel to the left hand support shaft 16 and spaced longitudinally therefrom. The intermediate spur wheel 18 is fixed to an intermediate-drive pinion 20 which is turnably arranged upon the right hand support shaft 19 and is in mesh with a final-drive spur wheel 21 turnably arranged on the left hand support shaft 16. The hub 22 of a clutch plate 23 is turnably and slidably arranged on the left hand support shaft 16 on the side of the final-drive spur wheel 21 remote from the initial-drive spur wheel 15.

The final-drive spur wheel 21 is provided with two angularly-spaced and outwardly-projecting dogs 24 and 25 (Figs. 6 to 8) produced by part shearing of the material of the wheel disc between the periphery and the axis of the latter. These dogs are adapted to engage with a similar pair of dogs 26 and 27 (Fig. 2) formed in similar manner on the clutch plate 23 and projecting towards the dogs on the final-drive spur wheel. One of the purposes of the cooperating dogs on the clutch plate 23 and the spur wheel 21 is to permit the gear train to be driven in the reverse direction while causing the pump mechanism (which is described hereinafter) to be rendered inoperative during the time the vehicle is moving in its reverse direction. The dogs are in operative engagement, when the clutch plate 23 and the final-drive spur wheel 21 rotate counter-clockwise as viewed from one end of the left hand support shaft 16, and they are disengaged when the clutch plate and spur wheel run in the opposite direction. In order to arrive at this result, the dogs are normally held in engagement by the compression of a coil spring 28 (Fig. 2) which surrounds the left hand support shaft 16 and which reacts between the common hub 22 of the clutch plate 23 and a cam 29 (referred to hereinafter) and the inner surface of the adjacent side of the casing 1.

The rotary motion of the clutch plate is transmitted to the above mentioned cam 29, which latter has an interrupted cam surface or is of the snail type, and is rotatably mounted on the left hand support shaft 16, by means of a driving pin 30 (Fig. 5) fixed in the cam and projecting from the latter into one of the openings formed in the clutch plate 23 by the part-shearing of the latter to form the dogs 26 and 27. A pump piston operating lever 33 (Figs. 3 and 5) is pivotally arranged on the right hand support shaft 19 with the tip of its shorter arm 34 in contact with the periphery of the cam 29 for triggering an intermittent impulse pump prior to its lubricant ejecting operation.

This impulse-pump, together with an associated outlet check valve, provides the only metering or apportioning means required by the present device to deliver intermittent charges of lubricant to one or more parts or bearings of the mechanism. This pump comprises a pump-cylinder 35, having a cylindrical bore therethrough, in which latter is fitted, with a tight sliding fit, an elongated cylindrical piston 38. The pump-cylinder 35 is fittedly housed and retained in a cylindrical chamber 36 formed in a boss-like enlargement 37 positioned in a corner portion and at the bottom of the casing 1 on an end wall of the latter remote from the driving shaft 3. One end of said cylindrical chamber 36 opens through said end wall of the casing 1 to permit insertion and removal of said pump-cylinder 35 and its other is formed with a reduced opening through which a reduced end of the pump-cylinder 35 projects for a distance. The outer end of the cylindrical chamber 36 beyond the pump-cylinder 35 is enlarged and internally threaded, into which is threaded an outlet union 45 to lock the pump-cylinder 35 against axial movement in the chamber 36 and to have its bore in communication with the bore of said pump-cylinder 35 and opposing the outer or discharge end of the piston 38.

The inner end of the piston 38 is formed with a threaded projection of reduced diameter, which projects through and beyond a complemental opening in the inner end of the pump-cylinder 35 into the interior of the casing 1. This projecting end of the piston is fitted with a flanged collar 39 held thereon by a nut 40. A helical compression spring 41 is positioned between the flange 39a of the collar 39 and a plug 42, fixed in the opposite end wall of the casing 1, to normally bias the piston 38 to its positions shown in Figs. 2, 3 and 4.

The longer arm 34a of the pump operating lever 33 engages the flange 39a on its side opposite to that engaged by the spring 41. Thus, the tip of its shorter arm 34 is held in contact with the periphery of the snail cam 29, by the pressure of spring 41 acting upon the pump-piston 38. While the lever 34 is riding the periphery of the cam 29, the lever 33 compresses the spring 41 and gradually moves the piston 38 inwardly (i.e. to the left from its position shown in Fig. 4) to uncover a lateral inlet port 43 inside of the pump-cylinder 35 and which is in communication with an overlying larger port 44 in the top wall of the boss 37. This movement of the piston draws and sucks into the pump cylinder 35 a measured amount of lubricant from the casing 1; and this suction continues a predetermined distance and until the short arm 34 passes the beak 29a of the cam 29, at which time the spring 41 quickly thrusts the piston 38 forward in its ejecting movement.

The lubricant charge, thus ejected by the piston 38 into distributing tubes 56, is a measured charge that has been measured within the pump-cylinder by the suction stroke of the piston and a check valve means 48 positioned in the union 45 at the outlet end of said pump-cylinder and, therefore, no metering or apportioning means is required at the bearings or parts to be lubricated.

The bore of the union 45 is formed with an intermediate reduced portion forming a shoulder 50 and its inner end is closed by an apertured valve-seat 47, thus forming a check-valve chamber 46 therebetween. The check-valve 48 is disposed in said chamber 46 and spaced from its side wall and is normally held on the valve-seat 47 by a compress spring 49, reacting between the valve 48 and the shoulder 50 to close the aperture surrounded by said valve-seat 47. The outer end 51, which communicates with the valve-chamber 46, is enlarged and internally threaded to provide a nipple 51a to which the distributing tubes 56 are connected. By providing the check-valve 48 at the outlet of the pump-cylinder 35 and with its biasing spring 49 to maintain valve 48 normally closed, the non-return of lubricant from the tubes 56 into the pump-cylinder 35 is not only assured, during the suction stroke of the piston 38, but cooperates with discharge end of the piston 38 and with the walls of the pump-cylinder 35 to definitely measure the lubricant charge admitted into the pump-cylinder 35 from the casing 1, thus providing a cheaper, compact, and unitary device.

Leakage of oil from the interior of the casing 1 externally thereof around the above mentioned plug 42 in the casing and also around the outlet union 45 is prevented by sealing rings 52 and 53 arranged in annular recesses formed respectively in these members.

One end of the casing 1 is provided with an oil inlet 54 to which an inlet union 55 is connected and which in turn communicates with a source of supply of lubricant L (Figs. 1 and 2).

On the completion of its discharge stroke, see Fig. 4, the pump piston 38 closes the oil inlet ports 43 and 44 and it is held temporarily in that position by means of the said piston-actuating coil spring 41. The non-return or check valve 48 is forced upon its seat under the action of its spring 49. Upon the rotation of the pump driving shaft 3 however, and through the worm 14, the reduction gearing and the dog-clutch, the cam 29 is caused to rotate and during its rotation it causes the piston operating lever 33 to pivot in the direction of the arrow in Figure 5 causing the pump piston to move in opposition to the coil spring 41, thereby sucking oil from the casing 1 into the pump cylinder after the piston has uncovered the inlet ports 43 and 44. When the cam 29 has rotated to such an extent that the tip of the shorter arm 34 of the piston operating lever 33 has cleared the beak 29A of the cam, the lever 33 breaks its operative connection with the cam-surface 29 and releases the piston 38 to the influence of the piston-actuating spring 41 which acts to move the piston 38 in the opposite direction and, thus, cause the piston to carry out its discharge stroke, at which time the valve 48 in the outlet union 45 is then forced off its seat and oil passes through the discharge passage 51a in the outlet union 45, where, by means of one or more conducting tubes or passages 56 (Fig. 2), the oil is delivered to such places of the mechanism of a vehicle or of a machine as may need lubrication. The complete cycle is then repeated on continued rotation of the cam.

From the above description it will be appreciated that the invention is applicable to the lubrication of rotating or reciprocating mechanical parts of a machine in desirable amounts of the lubricant in accordance with a selected number of revolutions carried out in a selected time period by one of the driven parts of a machine or of a vehicle.

That which is claimed, as new and to be secured by Letters Patent, is:

1. A lubricating device comprising a casing, a shaft journalled in said casing and having coupling means on at least one of its ends for connection to a driven mechanism, a reduction gearing mounted in said casing and geared with said shaft and including a final driven output gear wheel, a clutch disc facially opposing said final gear in said casing and slidably mounted for axial movement relative thereto, means normally biasing said disc toward said final gear, cooperating clutch teeth between the opposing faces of said disc and said final gear and formed for effective clutch engagement in only one direction of movement of said final gear, a rotatable member having an interrupted cam surface driven by said clutch disc, a lubricant charge measuring chamber in said casing and having an inlet opening communicating with a source of lubricant supply and having a discharge opening therein, a non-return discharge valve in the casing at said discharge opening and pressure means biasing said valve to closed position, a piston in said chamber biased under pressure to move toward said discharge opening and positioned relative to said inlet opening as to close the latter during its discharging movement and to open said inlet opening when moved in an opposite direction, a lever pivoted in the casing intermediate its ends and having one of its arms cooperating with said cam-surface and the other arm cooperating with said piston to move said piston against its bias, whereby, during one revolution of said cam-surface, said piston sucks lubricant into said chamber through its inlet and said lever is released at the interrupted portion of said cam to allow the piston to operate under its bias to discharge lubricant from said chamber.

2. An intermittent impulse lubricating device of the character described, comprising a casing forming a lubricant container, a driving shaft journaled in said casing, a coupling means at at least one end of said shaft for detachably connecting said shaft with a shaft externally of said casing for driving said driving shaft, a cylinder within said casing having an inlet opening positioned medially of its side wall communicating said cylinder with the interior of said casing and having an outlet opening at an end portion discharging from said casing, a non-return check valve at said outlet opening, a piston slidably fitted within said cylinder and dimensioned to close said inlet opening during its movement toward said outlet opening and to open said inlet opening during its retracted movement, pressure means normally closing said check valve except against the pressure of the lubricant under the ejecting action of said piston, thus permitting apportioned amounts of lubricant to be ejected therefrom, a stem projecting from said piston exteriorly of said cylinder and having an abutment thereon, a compression spring interposed between the end of said stem and said casing and normally and forcibly urging said piston toward said outlet opening, a lever in said casing and pivoted intermediate its ends with one end positioned to engage said abutment of the piston stem in opposition to said spring, a snail-cam journaled in said casing and positioned with its cam surface in operable engagement with the other end of said lever, a reduction-gearing mounted in said casing and driven from said driving shaft, and a clutch means between the output side of said gearing and said snail-cam to rotate said cam, when said shaft is rotated in one direction, so that the end of the lever engaging the cam will abruptly drop from the high point to the low point of said cam and subject the piston to the force of its biasing spring to eject a lubricant charge through said valve member and, when said shaft is rotated in an opposite direction, the clutch is ineffective to rotate said cam.

3. A self-contained lubricating device actuated by the movement of a mechanism, to be lubricated, for automatically delivering a charge of lubricant to an operating part or parts of said mechanism at predetermined times during the operation of said mechanism; said device comprising an impulse discharging pump having a pressure biased member for ejecting a lubricant charge and having an inlet communicating with a source of lubricant supply and an outlet, a non-return check-valve in said pump at its outlet permitting an apportioned quantity of lubricant under pressure to be discharged therefrom, means for triggering said pump member over a delayed period of time to condition said pump for its impulse operation and having a shaft-coupling means adapted to be detachably connected to an operating part of said mechanism for actuating said triggering means, said triggering means including means to actuate said pump member against its bias to automatically release said pump member for an impulse operation, after a predetermined number of operations of said mechanism, to eject an apportioned charge through said valve and, further, including a train of reduction gearing, and a one-way clutch at the output side of said gearing for rendering said triggering means effective, when the gearing is rotated in one direction, and ineffective, when the gearing is rotated in an opposite direction.

References Cited in the file of this patent

UNITED STATES PATENTS

| | | |
|---|---|---|
| 351,735 | Brill | Nov. 2, 1886 |
| 1,353,368 | Williams | Sept. 21, 1920 |
| 1,353,368 | Williams | Sept. 21, 1920 |
| 1,738,790 | Nutt | Dec. 10, 1929 |
| 1,803,456 | Atwood | May 5, 1931 |
| 1,803,703 | Hanson | May 5, 1931 |
| 1,929,764 | Zerk | Oct. 10, 1933 |
| 2,078,781 | Sprenger | Apr. 27, 1937 |
| 2,091,582 | Bever | Aug. 31, 1937 |
| 2,229,095 | Kocher | Jan. 21, 1941 |